United States Patent
Wada

(10) Patent No.: US 10,518,417 B2
(45) Date of Patent: Dec. 31, 2019

(54) ARTICLE RETRIEVAL SYSTEM

(71) Applicant: Fanuc Corporation, Yamanashi (JP)

(72) Inventor: Jun Wada, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 158 days.

(21) Appl. No.: 15/933,985

(22) Filed: Mar. 23, 2018

(65) Prior Publication Data

US 2018/0311824 A1 Nov. 1, 2018

(30) Foreign Application Priority Data

Apr. 28, 2017 (JP) ................................. 2017-089023

(51) Int. Cl.
*B25J 9/16* (2006.01)
*B25J 19/02* (2006.01)
(Continued)

(52) U.S. Cl.
CPC .......... *B25J 9/1697* (2013.01); *B25J 9/1612* (2013.01); *B25J 9/1664* (2013.01); *B25J 13/08* (2013.01);
(Continued)

(58) Field of Classification Search
CPC ...... B25J 9/1612; B25J 9/1664; B25J 9/1697; B25J 13/08; B25J 19/023; B25J 19/04;
(Continued)

(56) References Cited

U.S. PATENT DOCUMENTS 8,660,685 B2 * 2/2014 Irie ........................ B25J 9/1687
414/730
9,486,921 B1 * 11/2016 Straszheim ............ B25J 9/1679
(Continued)

FOREIGN PATENT DOCUMENTS

CN 103786153 A 5/2014
CN 104227723 A 12/2014
(Continued)

OTHER PUBLICATIONS

The State Intellectual Property Office of the People's Republic of China; First Office Action for Chinese Application No. 201810367322.8; dated Jun. 28, 2019; 6 pages.
(Continued)

*Primary Examiner* — Spencer D Patton
(74) *Attorney, Agent, or Firm* — Winstead PC

(57) ABSTRACT

Provided is an article retrieval system including: a sensor that measures the states of articles stored in a storage container; an article detection part for detecting the articles on the basis of the states of the articles measured by the sensor; handling part for retrieving the articles or changing the positions and/or orientations of the articles detected by the article detection part; and a controller that controls the sensor, the article detection part, and the handling part. The controller includes: a space dividing part for dividing the space in which the articles exist according to the states of the articles measured by the sensor; and a switching part for switching at least one of a method of measurement with the sensor, a method of detection with the article detection part, and a method of retrieval with the handling part in each of the spaces divided by the space dividing part.

6 Claims, 10 Drawing Sheets

(51) Int. Cl.
    *B25J 13/08*     (2006.01)
    *B25J 19/04*     (2006.01)
(52) U.S. Cl.
    CPC .............. *B25J 19/023* (2013.01); *B25J 19/04*
        (2013.01); *G05B 2219/39155* (2013.01); *G05B
              2219/39476* (2013.01); *G05B 2219/39543*
        (2013.01); *G05B 2219/40053* (2013.01); *G05B
                                  2219/40607* (2013.01)
(58) Field of Classification Search
    CPC ........... G05B 2219/39155; G05B 2219/39476;
              G05B 2219/39543; G05B 2219/40053;
                                   G05B 2219/40607
    See application file for complete search history.

(56) References Cited

U.S. PATENT DOCUMENTS

| | | |
|---|---|---|
| 2004/0117066 A1 | 6/2004 | Ban et al. |
| 2006/0057239 A1 | 3/2006 | Hariki et al. |
| 2010/0324737 A1 | 12/2010 | Handa et al. |
| 2012/0029686 A1* | 2/2012 | Ban .................. B25J 9/1679 700/218 |
| 2013/0006423 A1 | 1/2013 | Ito et al. |
| 2014/0121836 A1 | 5/2014 | Ban |
| 2014/0365010 A1 | 12/2014 | Yasuda et al. |
| 2015/0039129 A1 | 2/2015 | Yasuda et al. |
| 2015/0124057 A1* | 5/2015 | Yamazaki .......... B25J 9/1697 348/46 |
| 2017/0028562 A1 | 2/2017 | Yamazaki et al. |
| 2018/0056515 A1* | 3/2018 | Boca .................. B25J 9/1697 |

FOREIGN PATENT DOCUMENTS

| | | |
|---|---|---|
| CN | 104608149 A | 5/2015 |
| CN | 106393102 A | 2/2017 |
| EP | 1418025 A2 | 5/2004 |
| EP | 1642853 A2 | 4/2006 |
| EP | 2267658 A2 | 12/2010 |
| EP | 2810747 A2 | 12/2014 |
| EP | 2832503 A1 | 2/2015 |
| JP | H07-299782 A | 11/1995 |
| JP | 2004-160567 A | 6/2004 |
| JP | 2006-082186 A | 3/2006 |
| JP | 2011-022133 A | 2/2011 |
| JP | 2013-010155 A | 1/2013 |
| JP | 2014-237188 A | 12/2014 |
| JP | 2015-030044 A | 2/2015 |
| JP | 2015-079374 A | 4/2015 |
| JP | 2015-089590 A | 5/2015 |
| JP | 2016-148558 A | 8/2016 |
| JP | 2017-64910 A | 4/2017 |

OTHER PUBLICATIONS

Japan Patent Office, Office Action dated Dec. 18, 2018 for Japan Patent Application No. 2017-089023.

Japan Patent Office, Search Report dated Dec. 11, 2018 for Japan Patent Application No. 2017-089023.

* cited by examiner

ARTICLE RETRIEVAL SYSTEM

CROSS-REFERENCE TO RELATED APPLICATIONS

This application is based on Japanese Patent Application No. 2017-089023, the content of which is incorporated herein by reference.

Technical Field

The present invention relates to an article retrieval system.

Background Art

In the related art, a system for retrieving articles stored in a storage container, such as a container, using a robot is known (for example, see Patent Literature 1). In this system, the three-dimensional shapes of the articles in the storage container are measured with a three-dimensional sensor, and the positions and orientations of the articles are identified on the basis of the acquired three-dimensional data to enable retrieval by the robot.

CITATION LIST

Patent Literature

{PTL 1} Japanese Unexamined Patent Application Publication No. 2013-10155

Summary of Invention

An aspect of the present invention provides an article retrieval system including: a sensor that measures the states of articles stored in a storage container; an article detection part for detecting the articles on the basis of on the states of the articles measured by the sensor; a handling part for retrieving the articles or changing the positions and/or orientations of the articles detected by the article detection part; and a controller that controls the sensor, the article detection part, and the handling part. The controller includes: a space dividing part for dividing a space in which the articles exist according to the states of the articles measured by the sensor; and a switching part for switching at least one of a method of measurement with the sensor, a method of detection with the article detection part, and a method of retrieval with the handling part for each of the spaces into which the space has been divided by the space dividing part.

DESCRIPTION OF EMBODIMENT

An article retrieval system 1 according to an embodiment of the present invention will be described below with reference to the drawings.

Figure 1:
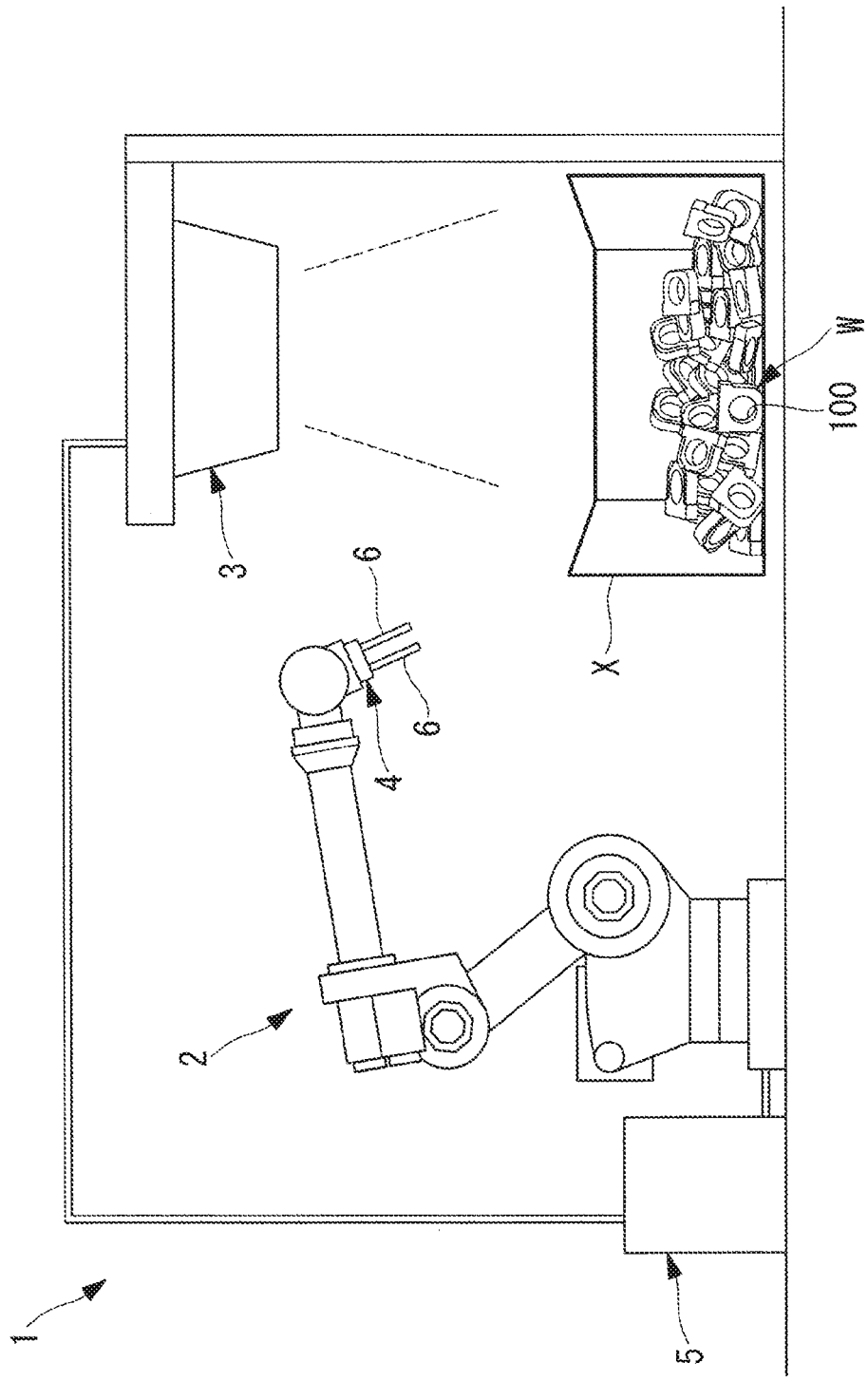
FIG. 1 shows the overall configuration of an article retrieval system according to an embodiment of the present invention.

As shown in FIG. 1, the article retrieval system 1 according to this embodiment is a system for retrieving or changing the positions and/or orientations of a large number of workpieces (articles) W, such as mechanical parts, stored in an open-top storage container X, such as a container, by using a robot (handling part) 2.

The article retrieval system 1 according to this embodiment includes a sensor (a two-dimensional camera and a three-dimensional camera) 3 that is located above the storage container X to acquire the states of the workpieces W in the storage container X located therebelow, the robot 2 having a hand (handling part) 4 that is capable of grasping a workpiece W and is attached to the distal end of a wrist of the robot 2, and a controller 5 that controls the robot 2, the sensor 3, and the hand 4.

The sensor 3 includes the two-dimensional camera (not shown) for acquiring a two-dimensional image of the workpieces W and the three-dimensional camera (not shown) for acquiring three-dimensional-shape data of the workpieces W.

The workpieces W are, for example, planar and each have a circular through-hole 100 penetrating in the thickness direction.

The robot 2 is, for example, a vertical articulated robot. The hand 4 has two grips 6 to be inserted into the through-hole 100 in a workpiece W. By opening the grips 6 inserted into the through-hole 100 in a closed state, the hand 4 can grasp the workpiece W. The robot 2 may have any shape, and the hand 4 may have any structure.

Figure 2:
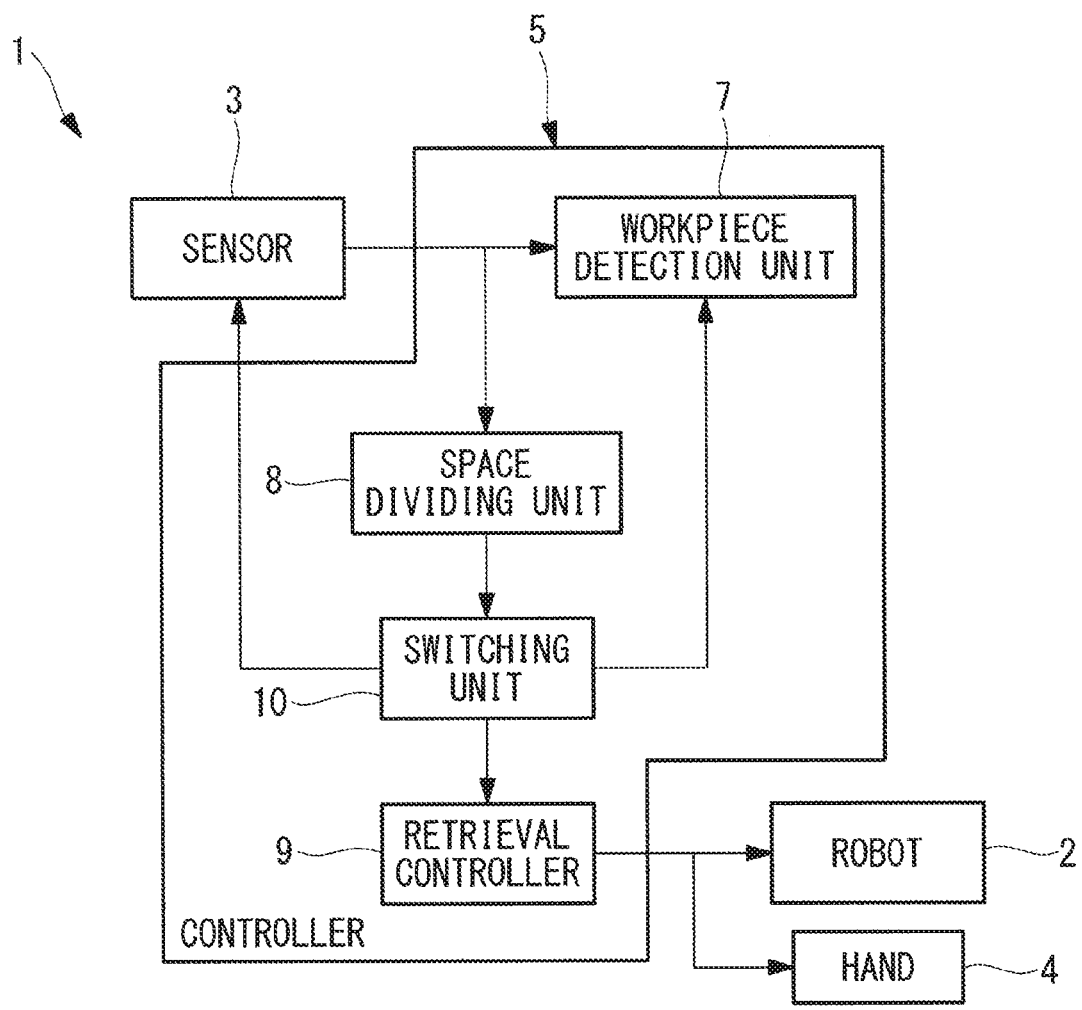
FIG. 2 is a block diagram of the article retrieval system in FIG. 1.

As shown in FIG. 2, the controller 5 includes a workpiece detection unit (article detection part) 7 that detects the workpieces W on the basis of the states of the workpieces W acquired by the sensor 3, a space dividing unit (space dividing part) 8 that divides the space in which the workpieces W exist according to the states of the workpieces W measured by the sensor 3, a retrieval controller 9 that controls the robot 2 and the hand 4, and a switching unit (switching part) 10 that switches at least one of the method of measurement with the sensor 3, the method of detection with the workpiece detection unit 7, and the method of retrieving the workpieces W with the robot 2 and the hand 4 by the retrieval controller 9 in each of the spaces divided by the space dividing unit 8. The controller 5 is a computer and includes a storage unit (not shown) that stores data and a processor (not shown) for processing the data.

Figure 3:
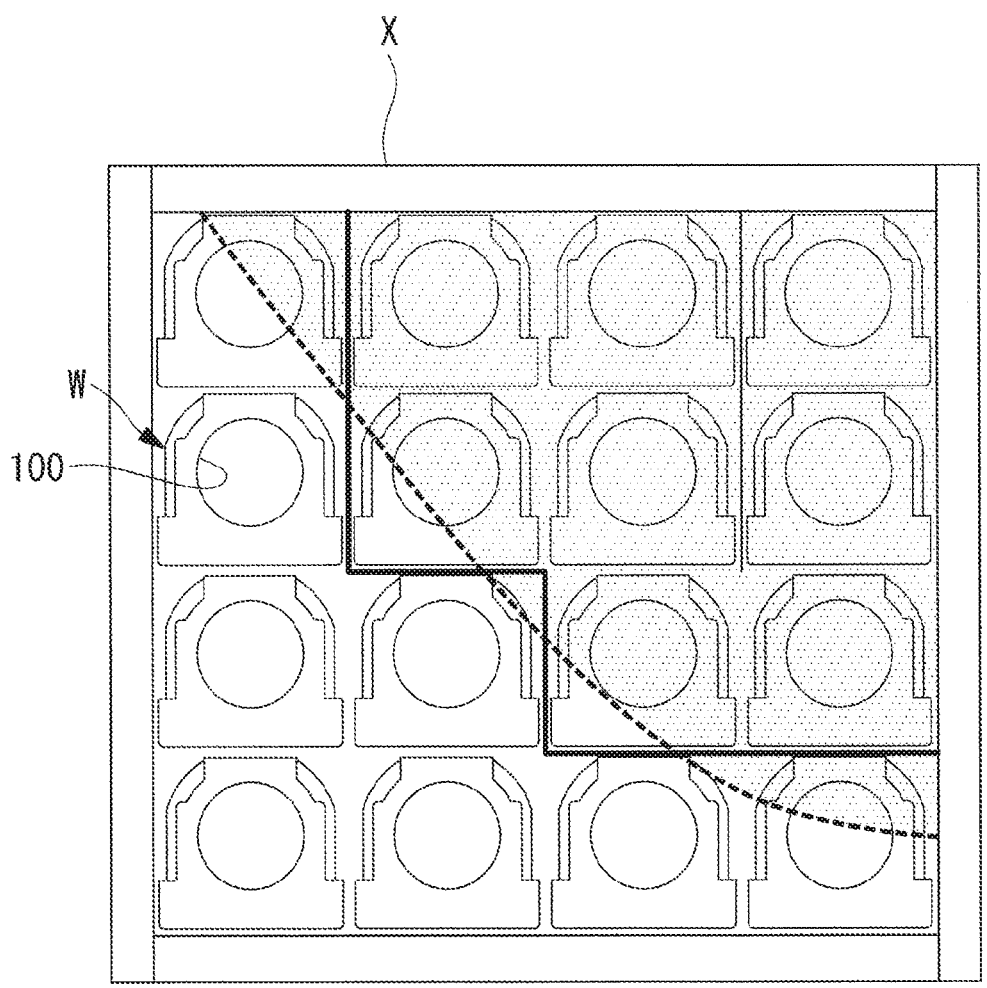
FIG. 3 shows an example of a two-dimensional image acquired by a sensor of the article retrieval system in FIG. 1 and space division.

In the example shown in FIG. 3, the space dividing unit 8 divides the space into a bright space and a dark space (shaded in FIG. 3) on the basis of the brightness of the two-dimensional image of the workpieces W acquired by the sensor 3. The space dividing unit 8 corrects a boundary line (shown by a dashed line in FIG. 3) dividing the space as a solid line such that the boundary line does not cross the workpieces W. In this case, the boundary line is corrected such that the workpieces W crossed by the boundary line are included on the side on which larger parts of the workpieces W are included.

The switching unit 10 switches the method of measurement with the sensor 3 in each of the divided spaces. Specifically, in the bright space, the switching unit 10 causes the sensor 3 to acquire a two-dimensional image with reduced exposure, whereas, in the dark space, the switching unit 10 causes the sensor 3 to acquire a two-dimensional image with increased exposure.

Figure 4:
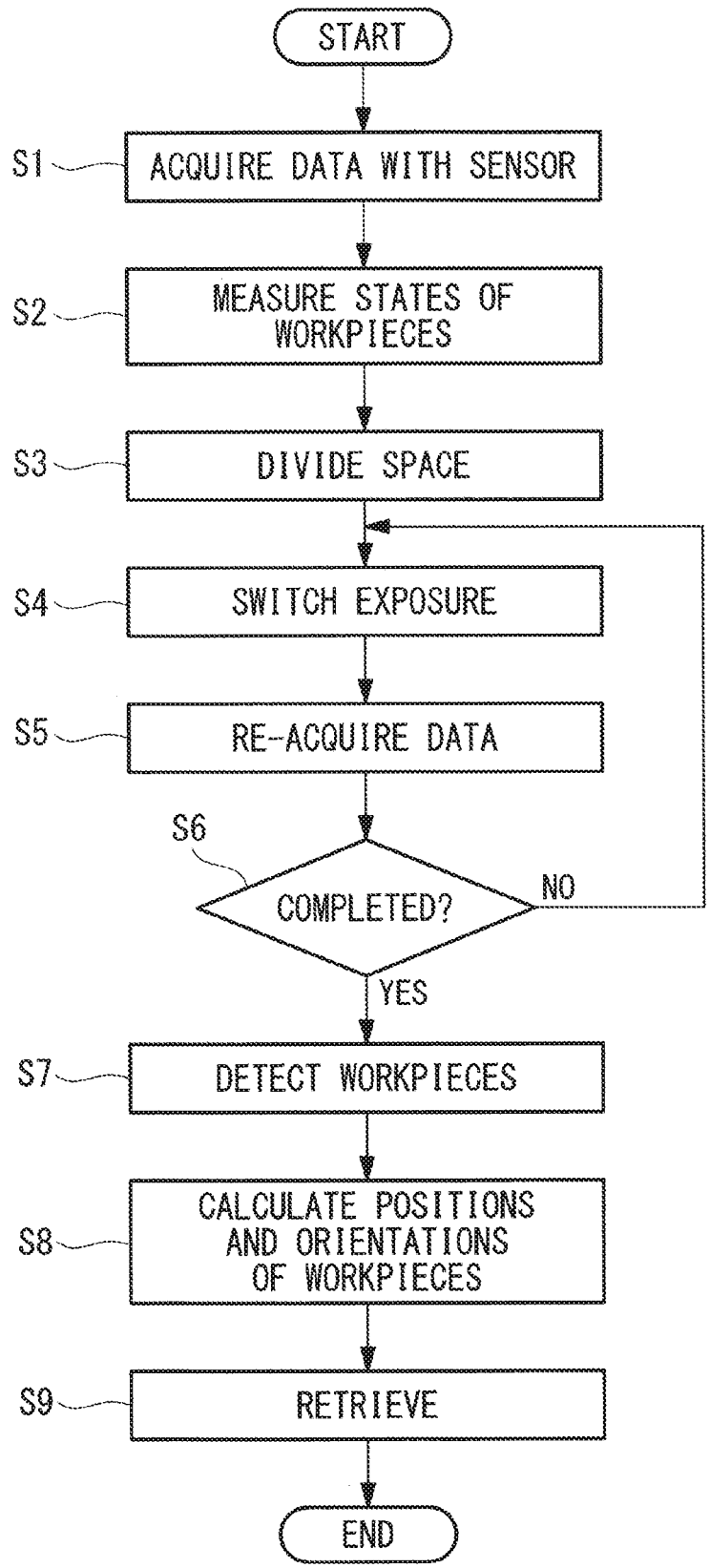
FIG. 4 is a flowchart explaining the operation of the article retrieval system performed in the case of FIG. 3.

The process in this case will be described. As shown in FIG. 4, first, the sensor 3 acquires data in the storage container X (step S1). Then, the states (brightness, conditions) of the workpieces W are measured on the basis of the acquired two-dimensional image (step S2), and the space is divided according to the states of the workpieces W (step S3).

Then, the exposure of the sensor 3 is changed in each of the divided spaces (step S4), data are re-acquired (step S5), and the process from step S4 is repeated in all the divided spaces (step S6). After the workpieces W are detected on the basis of the acquired two-dimensional image and three-dimensional-shape data (step S7), the positions and orientations of the workpieces W are calculated (step S8), and the positions and/or orientations of the workpieces W are changed, or the workpieces W are retrieved by the robot 2 and the hand 4 (step S9).

Figure 5:
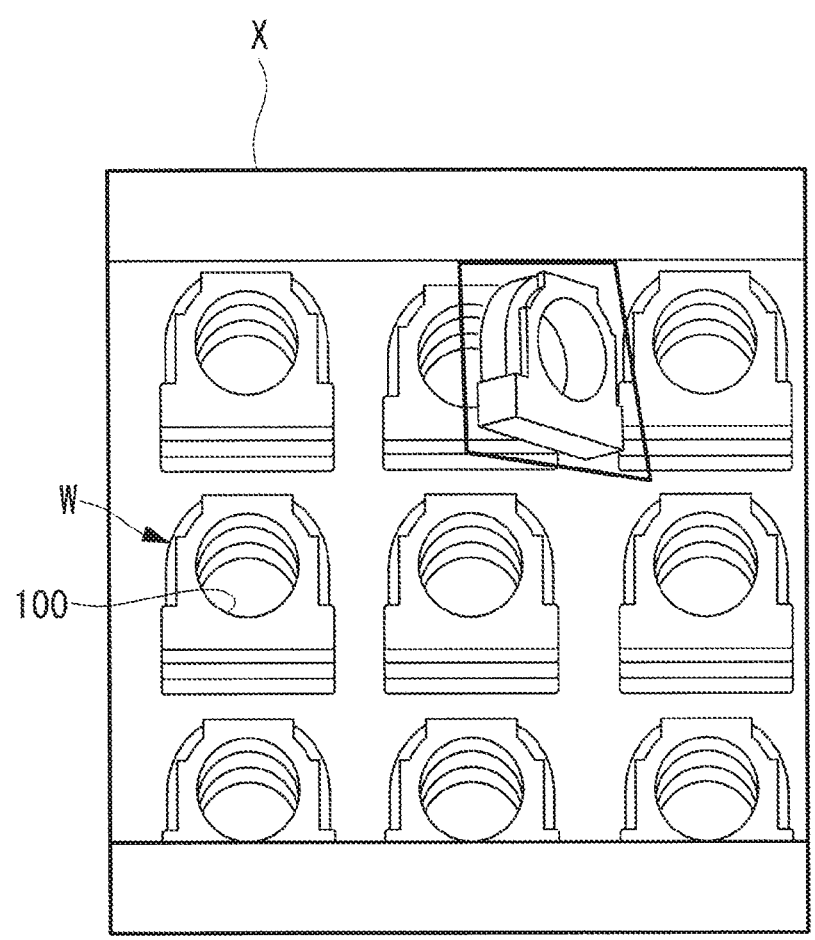
FIG. 5 shows another example of space division by the article retrieval system in FIG. 1.

Furthermore, FIG. 5 shows an example case in which one of the workpieces W that are in place is dislocated. In this case, on the basis of the three-dimensional-shape data of the workpiece W acquired by the sensor 3, the space dividing unit 8 divides, from the remaining space, a space in which the change in the height of the workpieces W in the space is different from that in the other places. The space divided by the space dividing unit 8 using a boundary line (shown by a solid line in FIG. 5) is a space in which the change in the height is different from that in the space where the workpieces W are stacked in place, that is, a space in which a workpiece W is dislocated.

The switching unit 10 switches a tool for detecting the workpieces W with the workpiece detection unit 7 in each of the divided spaces. More specifically, because the through-holes 100 look substantially circular in a space in which workpieces W are stacked in place, the workpieces W can be detected by performing pattern matching using a circular pattern, whereas because the through-holes 100 look elliptical in a space in which workpieces W are dislocated, the workpieces W can be detected by performing pattern matching that allows for distortion of a circular pattern.

In a space in which workpieces W are in place, it is possible to grasp a workpiece W by downwardly inserting the hand 4 into the through-hole 100 from the front (vertically above). In a space in which workpieces W are dislocated, the dislocation is corrected for (the position and/or orientation of a workpiece W is changed) or a workpiece W is removed by inserting the hand 4 into the through-hole 100 in an oblique direction or by pushing the workpiece W with the hand 4, and then the workpiece W can be retrieved by the same retrieval method as one used in the space in which the workpieces W are in place.

Figure 6:
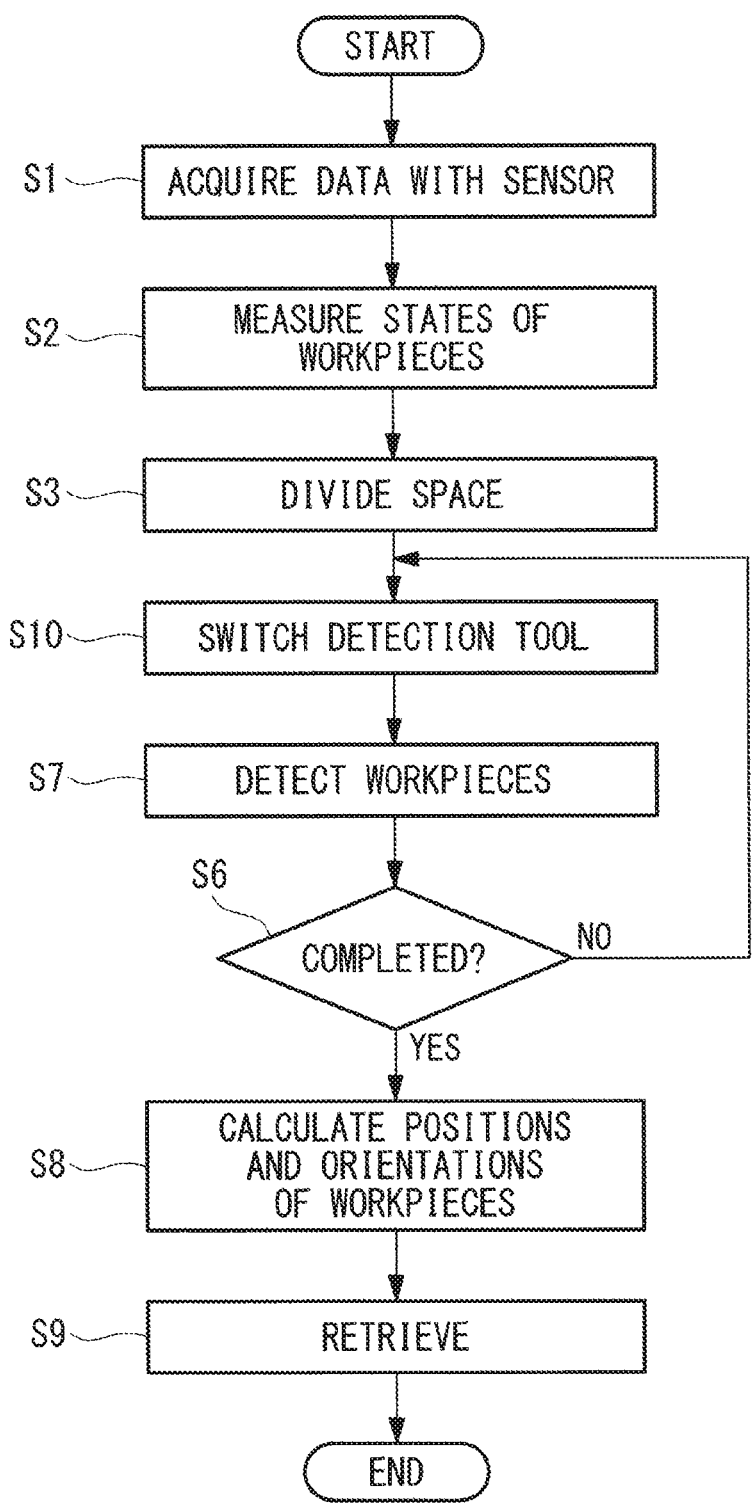
FIG. 6 is a flowchart explaining the operation of the article retrieval system performed in the case of FIG. 5.

The process in this case will be described. As shown in FIG. 6, first, the sensor 3 measures the inside of the storage container X (data acquisition) (step S1). Then, the states of workpieces W (the conditions, such as the inclination) are measured on the basis of the acquired three-dimensional-shape data (step S2), and the space is divided according to the states of the workpieces W (step S3).

Then, the detection tool is switched in each of the divided spaces (step S10), the workpieces W are detected (step S7), and the process from step S10 is repeated in all the divided spaces (step S6). Then, the positions and the orientations of the workpieces W are calculated (step S8), and the workpieces W are retrieved by the robot 2 and the hand 4 while the retrieval method is switched in each space (step S9).

Figure 7:
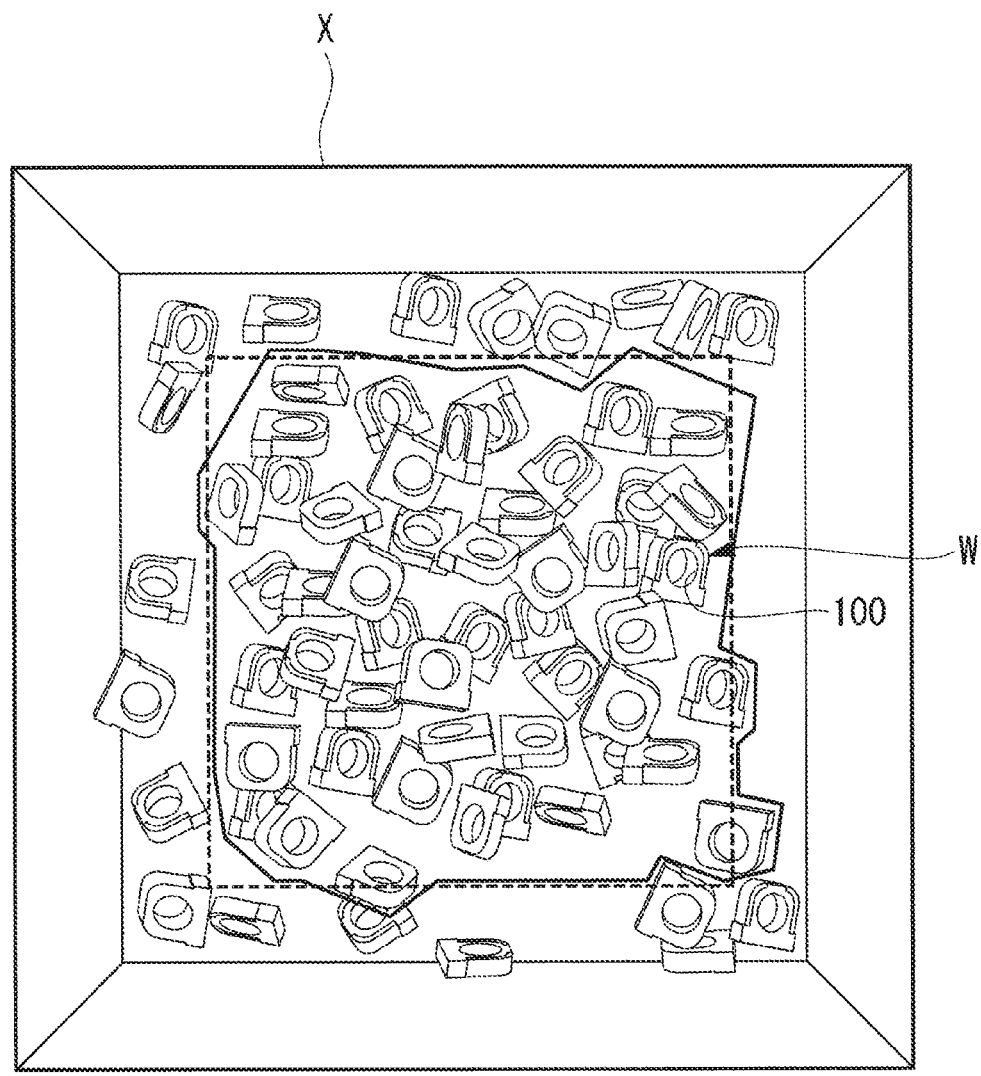
FIG. 7 shows another example of space division by the article retrieval system in FIG. 1.

FIG. 7 shows an example case in which a large number of workpieces W are stored in bulk in the storage container X. In this case, the space dividing unit 8 divides the space depending on whether the distance from the inner wall of the storage container X is large or not.

More specifically, the space dividing unit 8 divides the space depending on whether the distance from the storage container X is greater than or equal to a predetermined value, as indicated by a boundary line shown by a dashed line in FIG. 7 and corrects the boundary line as the solid line such that the boundary line does not cross the workpieces W detected by the two-dimensional image or the three-dimensional-shape data.

More specifically, depending on which of the inside and the outside of the boundary line shown by the dashed line larger parts of the workpieces W exist in, the boundary line is corrected as the solid line such that the entire workpieces W are located in the space in which larger parts of the workpieces W are located.

The switching unit 10 switches the method of retrieval with the robot 2 and the hand 4 in each space. More specifically, because the hand 4 does not interfere with the inner wall of the storage container X in the inner space, it is possible to relatively freely determine the orientation of the robot 2 and the hand 4 when retrieving the workpieces W.

In contrast, because the hand 4 is likely to interfere with the inner wall of the storage container X that is located nearby in the outer space, the hand 4 is brought toward a workpiece W from the side opposite from the inner wall, the workpiece W is pulled into the space inside the boundary line, and then the workpiece W can be retrieved by the same retrieval method as used in the space inside the boundary line.

Figure 8:
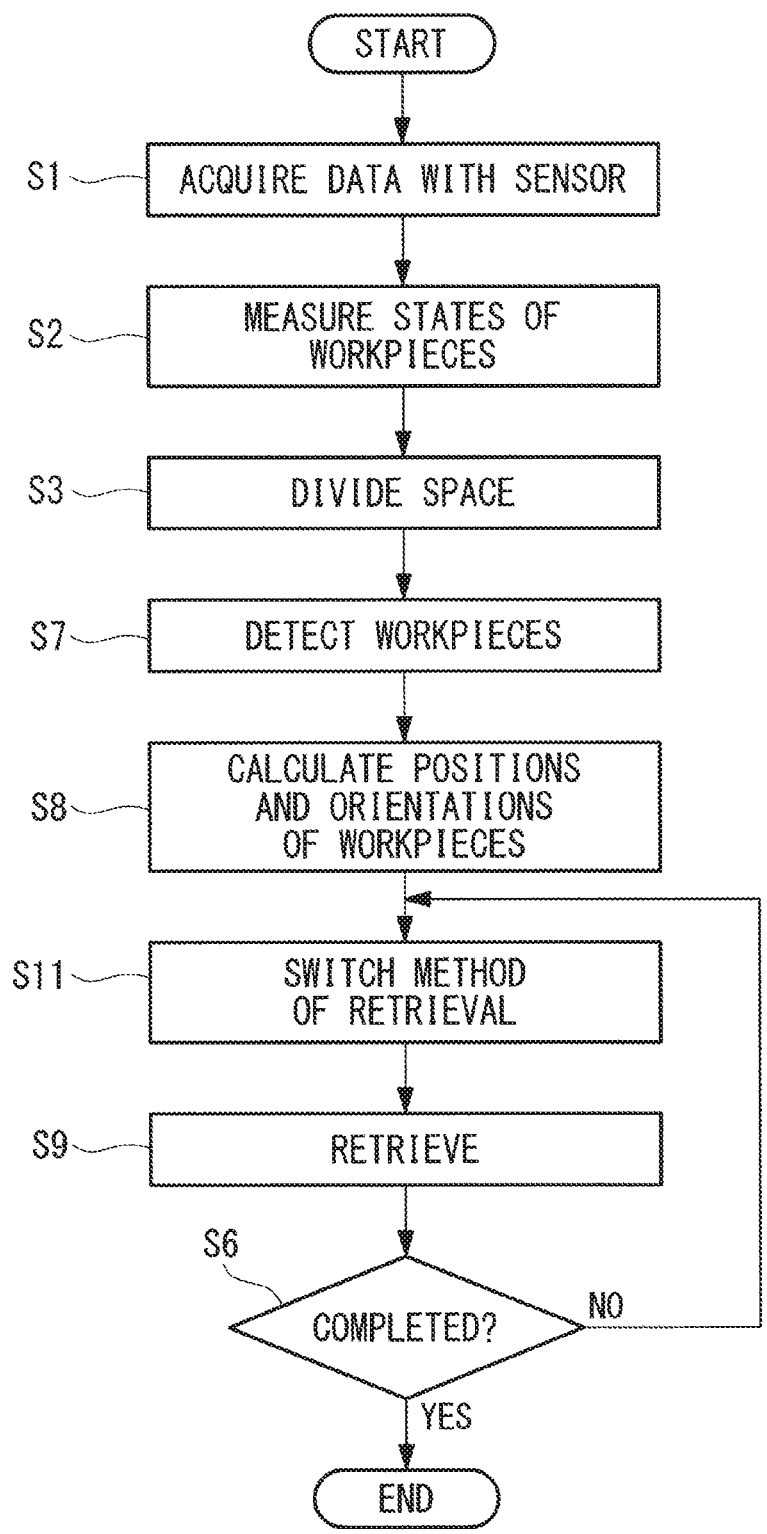
FIG. 8 is a flowchart explaining the operation of the article retrieval system performed in the case of FIG. 7.

The process in this case will be described. As shown in FIG. 8, first, the sensor 3 measures the inside of the storage container X (data acquisition) (step S1). Then, the distances from the storage container X (the states of the workpieces W, conditions) are measured on the basis of the acquired three-dimensional-shape data (step S2), and the space is divided according to the states of the workpieces W (step S3).

Then, the workpieces W are detected (step S7), the positions and the orientations of the workpieces W are calculated (step S8), the retrieval method is switched in each space (step S11), the workpieces W are retrieved by the robot 2 and the hand 4 (step S9), and the process from step S11 is repeated in all the divided spaces (step S6).

The thus-configured article retrieval system 1 according to this embodiment provides an advantage in that, even if the workpieces W are stored in the storage container X in various states, more workpieces W can be accurately detected and retrieved from the storage container X.

Figure 9:
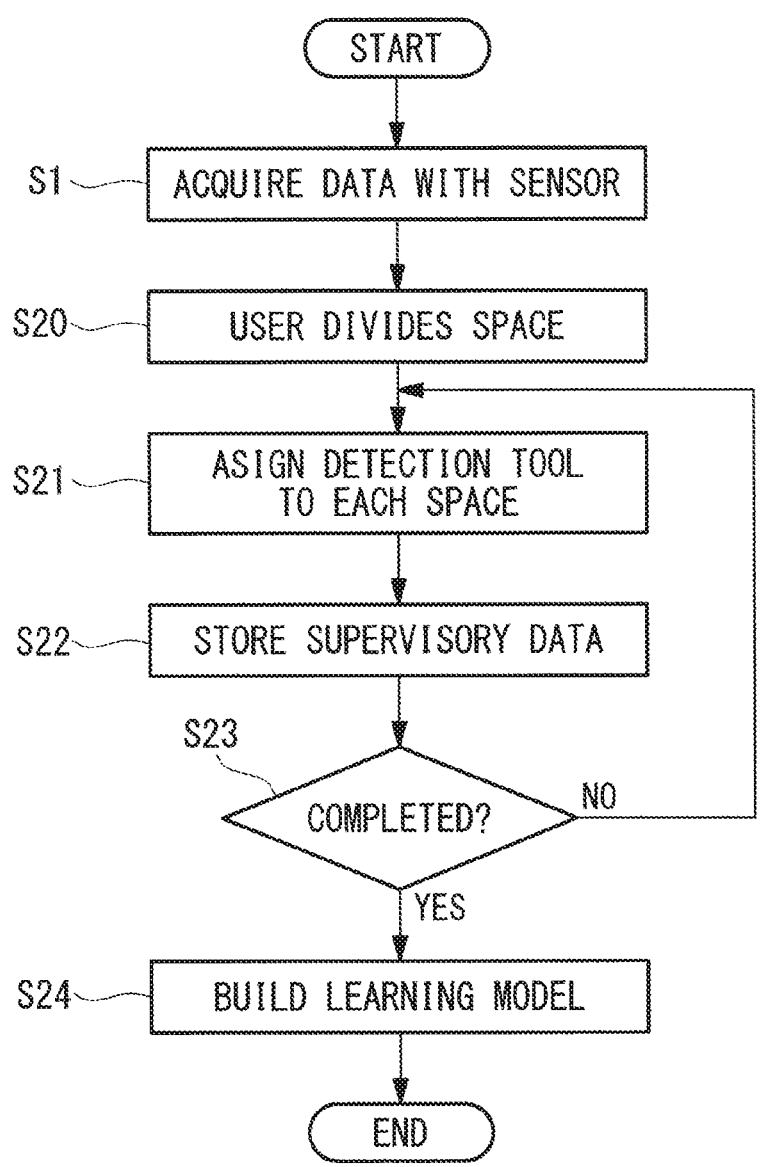
FIG. 9 is a flowchart for explaining building of a learning model in machine learning in which detections tools are assigned to spaces divided by a user, in the article retrieval system in FIG. 1.

In the article retrieval system 1 according to this embodiment, the space dividing unit 8 divides the space on the basis of the states of the workpieces W in at least one of the two-dimensional image and the three-dimensional shapes detected by the sensor 3. However, the space may be divided by using machine learning. For example, as shown in FIG. 9, the sensor 3 acquires a two-dimensional image or three-dimensional-shape data (step S1), a user divides the space in the two-dimensional image or three-dimensional-shape data acquired by the sensor 3 (step S20), preliminarily prepared detection tools are assigned to the respective spaces (step S21), and the spaces and the measurement results are associated with each other and are stored as supervisory data (step S22). After step S21 and step S22 are repeated to accumulate data (step S23), a learning model can be built (step S24).

Figure 10:
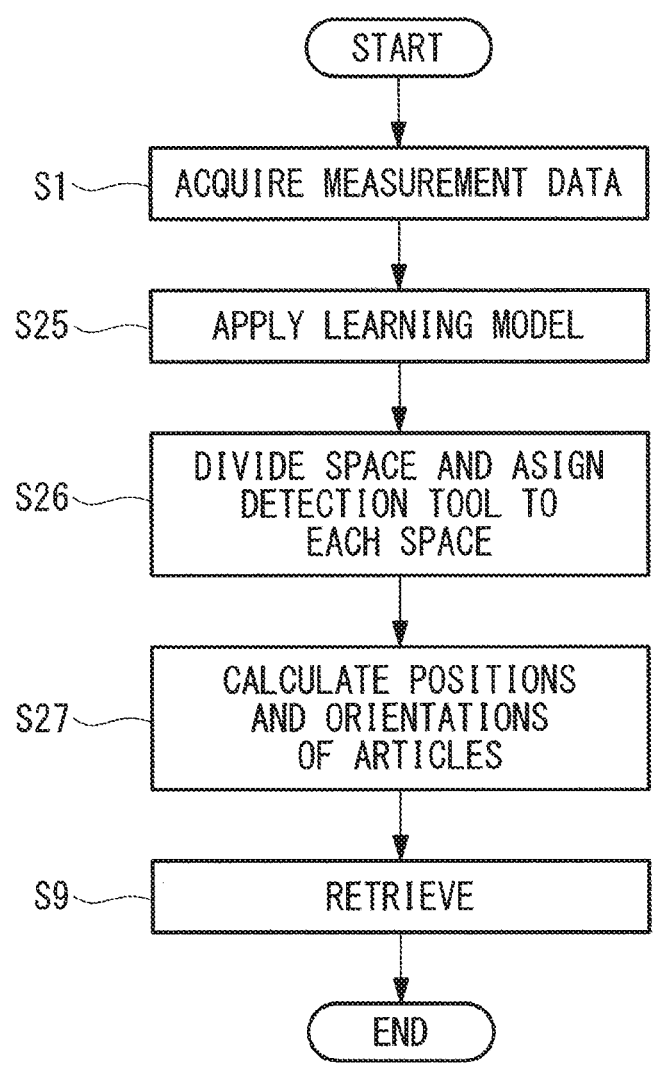
FIG. 10 is a flowchart explaining the article-retrieval operation achieved by applying the learning model in FIG. 9.

After the learning model is built, as shown in FIG. 10, when the sensor 3 acquires a two-dimensional image and three-dimensional-shape data of the workpieces W (step S1), the learning model is applied (step S25), the space in the storage container X is divided, and a suitable detection tool is assigned to each space (step S26). As a result, even when the conditions for space division are unclear, the learning model can clearly classify the workpieces W into any one of the spaces, and it is possible to accurately calculate the positions and orientations of the workpieces W (step S27) and to retrieve more workpieces W from the storage container X (step S9).

Furthermore, although planar workpieces W each having a circular through-hole 100 have been shown as an example in this embodiment, the workpieces W are not limited thereto. The hand 4 to be employed may have any structure, depending on the shape of the workpieces W.

Although the spaces and the detection tools are associated with the workpieces W by a learning model, instead, at least one of the method of measurement with the sensor 3, the tool for detecting the workpieces W, and the method of retrieval with the robot 2 and the hand 4 may be switched.

As a result, the above-described embodiment leads to the following aspect.

An aspect of the present invention provides an article retrieval system including: a sensor that measures the states of articles stored in a storage container; an article detection part for detecting the articles on the basis of on the states of the articles measured by the sensor; a handling part for retrieving the articles or changing the positions and/or orientations of the articles detected by the article detection part; and a controller that controls the sensor, the article detection part, and the handling part. The controller includes: a space dividing part for dividing a space in which the articles exist according to the states of the articles measured by the sensor; and a switching part for switching at least one of a method of measurement with the sensor, a method of detection with the article detection part, and a method of retrieval with the handling part for each of the spaces into which the space has been divided by the space dividing part.

According to this aspect, the states of the articles in the storage container are measured by the sensor, the articles are detected by the article detection part on the basis of the measured states of the articles, and the detected articles are retrieved from the storage container, or the positions and/or orientations of the articles are changed by the handling part.

In this case, the space in the storage container in which the articles exist is divided by the space dividing part according to the states of the articles measured by the sensor, and at least one of the measurement method, the detection method, and the retrieval method is switched in each of the divided spaces. Thus, not the same measurement method, detection method, and retrieval method, but a different measurement method, detection method, and retrieval method are applied to articles in different states depending on the states of the articles. Hence, it is possible to retrieve more articles from the storage container even if the articles are stored in the storage container in various states.

In the above aspect, the sensor may include: a two-dimensional camera that acquires a two-dimensional image of the articles; and a three-dimensional camera that acquires the three-dimensional shape of the articles.

With this configuration, a two-dimensional image including the states, such as the brightness and the colors, of the articles is acquired by the two-dimensional camera, and the three-dimensional shapes including the states, such as the orientations and the heights, of the articles is acquired by the three-dimensional camera. As a result, it is possible to divide articles according to the states thereof on the basis of the two-dimensional image and the three-dimensional shapes of the articles.

In the above aspect, the space dividing part may divide the space on the basis of at least one of the two-dimensional image and the three-dimensional shapes acquired by the sensor, and the switching part may switch at least one of a condition for measuring the two-dimensional image and a condition for measuring the three-dimensional shapes with the sensor for each of the divided spaces.

With this configuration, by switching the condition for measurement and performing the measurement in each of the spaces divided on the basis of at least one of the two-dimensional image and the three-dimensional shapes acquired by the sensor, the subsequent detection of the articles can be accurately performed.

In the above aspect, the space dividing part may divide the space on the basis of at least one of the two-dimensional image and the three-dimensional shapes acquired by the sensor, and the switching part may switch a tool for detecting the articles used by the article detection part for each of the divided spaces.

With this configuration, for example, when there are articles that are in place and articles that are dislocated in the same space, by dividing the space into spaces to which both articles belong on the basis of at least one of the two-dimensional image and the three-dimensional shapes of the articles, and by switching the detection tool in each space, it is possible to accurately detect the articles in each space.

In the above aspect, the space dividing part may divide the space in the storage container on the basis of at least one of the two-dimensional image and the three-dimensional shapes acquired by the sensor, and the switching part may switch the retrieval method or a method of changing the positions and/or orientations of the articles with the handling part for each of the divided spaces.

For example, articles located away from the inner wall of the storage container can be retrieved without concern of interference between the handling part and the inner wall of the storage container. However, regarding articles located near the inner wall of the storage container, methods of retrieval or methods of changing the positions and/or orientations thereof with the handling part are limited.

With this configuration, because the retrieval method can be switched depending on whether the article is near the inner wall of the storage container or not, it is possible to retrieve more articles from the storage container.

In the above aspect, among the method of measurement, the method of detection, and the retrieval method that are switched by the switching part, an optimum method of measurement, an optimum method of detection, and an optimum retrieval method according to the states of the articles may be set by machine learning.

With this configuration, because the optimum method of measurement, method of detection, and retrieval method according to the state of the article are statistically set by machine learning, even when there are no clear conditions for dividing the space, it is possible to set appropriate measurement method, detection method, and retrieval method.

The present invention provides an advantage in that it is possible to retrieve more articles from a storage container even if the articles are stored in the storage container in various states.

REFERENCE SIGNS LIST 1 article retrieval system
2 robot (handling part)
3 sensor (two-dimensional camera, three-dimensional camera)
4 hand (handling part)
5 controller
7 workpiece detection unit (article detection part)
8 space dividing unit (space dividing part)
10 switching unit (switching part)
W workpiece (article)
X storage container

The invention claimed is:

1. An article retrieval system comprising:
a sensor that measures the states of articles stored in a storage container;
an article detection part for detecting the articles on the basis of the states of the articles measured by the sensor;
a handling part for retrieving the articles or changing positions and/or orientations of the articles detected by the article detection part; and
a controller that controls the sensor, the article detection part, and the handling part,
wherein the controller includes:
a space dividing part for dividing a space in which the articles exist according to the states of the articles measured by the sensor; and
a switching part for switching at least one of a method of measurement with the sensor, a method of detection with the article detection part, a method of retrieval of the articles with the handling part, and a method of changing the positions and/or orientations of the articles with the handling part for each of spaces into which the space has been divided by the space dividing part.

2. The article retrieval system according to claim 1, wherein the sensor includes:
a two-dimensional camera that acquires a two-dimensional image of the articles; and
a three-dimensional camera that acquires three-dimensional shapes of the articles.

3. The article retrieval system according to claim 2, wherein
the space dividing part divides the space on the basis of at least one of the two-dimensional image and the three-dimensional shapes acquired by the sensor, and
the switching part switches at least one of a condition for measuring the two-dimensional image and a condition for measuring the three-dimensional shapes with the sensor for each of the divided spaces.

4. The article retrieval system according to claim 2, wherein
the space dividing part divides the space on the basis of at least one of the two-dimensional image and the three-dimensional shapes acquired by the sensor, and
the switching part switches a tool for detecting the articles used by the article detection part for each of the divided spaces.

5. The article retrieval system according to claim 2, wherein
the space dividing part divides the space in the storage container on the basis of at least one of the two-dimensional image and the three-dimensional shapes acquired by the sensor, and
the switching part switches the method of retrieval of the articles or the method of changing the positions and/or orientations of the articles with the handling part for each of the divided spaces.

6. The article retrieval system according to claim 1, wherein, dividing of the space by the dividing part, and switching of the method of measurement, the method of detection, the method of retrieval of the articles and the method of changing the positions and/or orientations of the articles by the switching part, are set by machine learning.

* * * * *